UNITED STATES PATENT OFFICE.

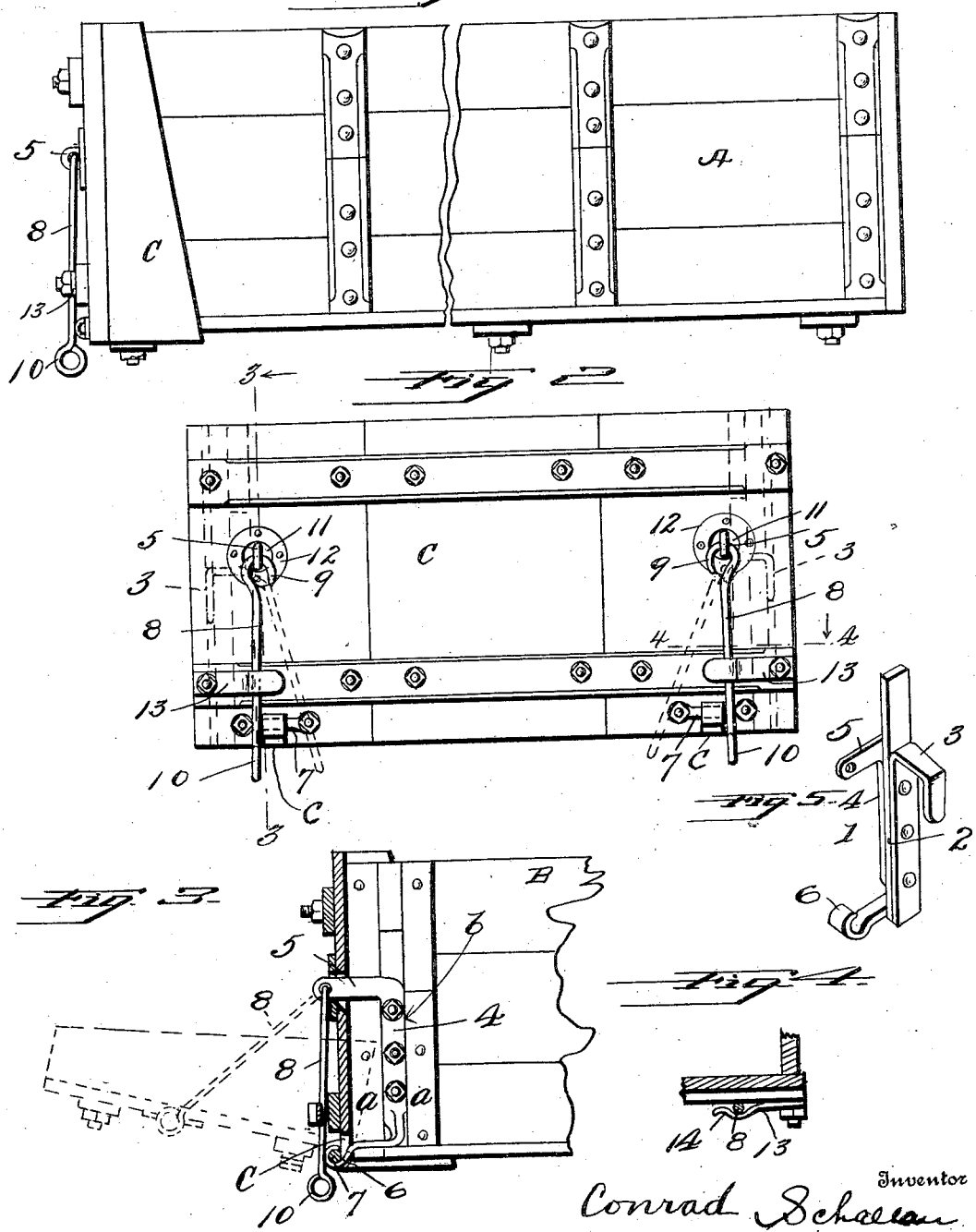

CONRAD SCHALLAU, OF WATKINS, IOWA.

END-GATE.

935,168.  Specification of Letters Patent.  Patented Sept. 28, 1909.

Application filed September 4, 1906. Serial No. 333,162.

*To all whom it may concern:*

Be it known that I, CONRAD SCHALLAU, a citizen of the United States, residing at Watkins, in the county of Benton and State of Iowa, have invented certain new and useful Improvements in End-Gates, of which the following is a specification.

This invention relates to new and useful improvements in end gates for wagons, and it particularly pertains to an end gate of that type known as "scoop board", which serves to discharge the contents of the wagon when the latter is tilted.

The invention aims as a primary object to provide an end gate of the above type, which with its appurtenant parts can be readily assembled upon the wagon and which may be readily disassembled therefrom.

The invention aims as a further object to provide an end gate in which the locking elements also serve the function of keepers or braces for the end gate when the latter is in its closed position.

The detailed construction will appear in the course of the following description in which reference is had to the accompanying drawings forming a part of this specification, like reference characters designating like parts throughout the several views therein.

Figure 1 is a side elevation of a wagon body with my improved end gate applied thereto. Fig. 2 is an end elevation showing the end gate in plan. Fig. 3 is a vertical section, on the line 3—3 of Fig. 2, of the end gate showing the manner of securing the same to a wagon. Fig. 4 is a fragmentary horizontal section on the line 4—4 of Fig. 2, and Fig. 5 is a detailed perspective view of one of the elements of the invention to be hereinafter specifically referred to.

Referring to the accompanying drawings, the letter A designates a wagon body of approved or conventional form which is provided at its ends with vertical cleats $a$ arranged in spaced parallel relation and between which a recess $b$ occurs. In the preferred embodiment of my invention the wagon body A is formed with removable upper side portions B which are likewise provided with cleats similarly constructed and arranged to those described. In Fig. 5, a member 1 is illustrated, which comprises a body portion 2 designed to interfit the recess $b$ between the cleats $a$. The body portion 2 is provided on one side thereof with a rigidly secured hooked member 3 which is designed to engage the upper edge of the wagon or the upper edge of one of the intermediate side panels thereof. The body portion 2 extends upwardly above the hooked member 3 as clearly shown in Fig. 5. The body portion 2 has secured thereto upon its opposite side a member 4 provided with a rearwardly extending apertured upper end 5, and a rearwardly extending lower portion terminating in a flattened hooked extremity 6. Members similar to member 1 are arranged in the rear portion of the wagon body A in the manner described, and as shown in Fig. 3 upon each side of said body. The end gate C is of suitable shape to conform to the proportions of the wagon and to serve its function as a scoop board. Said end gate is provided in its lower edge with recesses $c$, between the walls of which transverse straps 7 are mounted. The straps 7 are designed to engage in the hooks 6 and to coact therewith in affording a hinge or fulcrum for the end gate in its pivotal movement.

Keepers 8, as illustrated in Figs. 2 and 3, are employed to retain the end gate in closed position and to serve as a brace for the same in its open position. Each of the keepers 8 comprises a member formed with a hooked upper end as at 9, and with an enlarged lower end, preferably in the form of an eye. The keepers 8 are projected through apertures 11 provided in the end gate, the said apertures being preferably reinforced at their edges by a metallic ring 12. It will be readily seen that the enlarged head 10 is of necessity of greater proportions than the aperture 11, in order that said head may engage the walls of the said aperture to support said end gate as a brace. In this relation the hooked end 9 loosely engages the rearwardly extending apertured upper end 5 of the member 4. For the purpose of retaining the keepers 8 in position to lock the end gate, spring latch dogs 13, provided with bowed ends 14, are secured to the end gate as shown in detail in Fig. 4. The bowed ends 14 are designed to frictionally engage the keepers 8.

In practical use when it is desired to open the end gate, the keepers 8 are moved laterally and inwardly until they are free from the latch members 13. The end gate may then be swung upon the straps 7 as pivots to the dotted line position of Fig. 3. In this position the member 8 serves as a positive brace and support. When it is desired to close the end gate the same is swung to the full line position in Fig. 3 until the forwardly extending portions 5 carried upon the members 1 project through the apertures 11 and allow the keepers 8 to drop by gravity to a perpendicular position. In this relation said keepers are engaged in the members 13 in the well known manner, and the end gate is locked against accidental displacement.

While the elements herein shown and described are well adapted to serve the functions set forth, it is obvious that various minor changes may be made in the proportions, shape and arrangement of the several parts without departing from the spirit and scope of my invention as defined in the appended claim.

Having fully described my invention, I claim:

In a device of the character described, the combination with a wagon body provided with sides and a hinged end gate, said sides being provided with spaced strips near the rear end thereof, of members adapted to be secured to said sides between said spaced strips for supporting said end gate, each of said members comprising a U-shaped member having off-set extremities secured to one side of a body portion, one of said extremities being hooked and the other apertured, an engaging member having an upper hooked end secured to the other side of said body portion, said body portion extending upwardly beyond said U-shaped member and said engaging member, substantially as described.

In testimony whereof I affix my signature in presence of two witnesses.

CONRAD SCHALLAU.

Witnesses:
J. H. PICKART,
L. S. KNOUF.